United States Patent [19]

Pokhodenko et al.

[11] 4,397,922

[45] Aug. 9, 1983

[54] CHEMICAL POWER SUPPLY

[76] Inventors: Vitaly D. Pokhodenko, ulitsa Anri Barbjusa, 22/26, kv. 26; Vyacheslav G. Koshechko, prospekt Vossoedinenia, 13a, kv. 137; Vladimir I. Barchuk, ulitsa Piterskaya 4, kv. 8; Kim S. Isagulov, bulvar Lesi Ukrainki, 5, kv. 142, all of Kiev, U.S.S.R.

[21] Appl. No.: 305,810

[22] Filed: Sep. 25, 1981

[51] Int. Cl.³ .......................................... H01M 10/40
[52] U.S. Cl. .................................... 429/105; 429/213
[58] Field of Search ............................... 429/105, 213

[56] References Cited

U.S. PATENT DOCUMENTS 3,110,630 11/1963 Wolfe ............................... 429/105
3,404,042 10/1968 Forster et al. ..................... 429/105
3,578,500 5/1971 Maricle et al. .................... 429/105
3,804,675 4/1974 Hill .................................. 429/213

Primary Examiner—Donald L. Walton
Attorney, Agent, or Firm—Ladas & Parry

[57] ABSTRACT

A chemical power supply comprises a cathode and an anode including active materials dissolved in an electrolyte based on an organic solvent, and a diaphragm for separating the cathode from the anode.

The cathode active material is a stable radical selected from the group consisting of a stable cation-radical of an aromatic amine, a stable cation-radical of a heterocyclic compound, a stable electrically neutral radical of an aromatic oxygen-containing compound, a stable electrically neutral radical of an aromatic nitrogen-containing compound, while the anode active material is a stable anion-radical of an aromatic compound.

6 Claims, No Drawings

CHEMICAL POWER SUPPLY

BACKGROUND OF THE INVENTION

1. Field of the Invention

The invention relates to chemical power supplies, and more particularly to chemical power supplies employing an electrolyte based on an organic solvent.

The invention can be utilized to provide for an independent power supply for electronic devices.

In modern practice, extensive use has been made of chemical power supplies employing an electrolyte based on an organic solvent. However, known chemical power supplies possess poor performance properties. For this reason, the development of novel chemical power supplies possessing better performance properties, is urgent.

2. Prior Art

Known in the art is an electro-chemical current producing cell, comprising a lithium anode, a cathode, a separator adapted for separating the cathode from the anode, and an electrolyte based on an organic solvent (U.S. Pat. No. 3,804,675). The cathode being utilized in said electro-chemical current producing cell is an organic complex consisting of an organic acceptor and an organic donor. The acceptor includes such halogenides as chloranil, bromanil or iodanil. Such compounds as p-phenylene diamine, 3,8-diamino pyrene, dimethyl aniline, tetramethyl-p-phenylene diamine, or 3,10-diamino pyrene may be used as donors. As it is disclosed in the above patent, the preferred combination of the acceptor and the donor is a complex compound comprising chloranil and p-phenylene diamine:

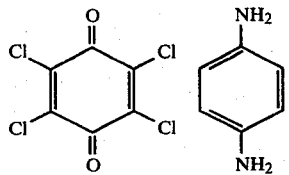

In spite of the fact that the halogenide is soluble in the organic solvents, said complex compound is, as a whole, insoluble in the organic solvents. For this reason said complex compound is mixed in this electro-chemical current producing cell instead of dissolving in the electrolyte based on organic solvents. Such organic solvents as propylene carbonate, gamma-butyrolactone and methyl formate, are utilized. The electrolyte further comprises a light metal salt. Light metal perchlorates, tetrachloroaluminates and tetrafluoroborates can be utilized as said salt.

The separator (diaphragm separating the cathode from the anode) is formed by electrochemical reaction proceeding within said electrochemical current producing cell.

Such a separator consisting of a lithium-chloranil salt, allows the lithium ions to migrate to the cell cathode, and at the same time maintains an electron barrier between the cathode and the anode.

Maximum electromotive force of the above described cell is of 3.25 V.

Said electro-chemical current producing cell is designed for one-time use.

Also known in the art is an electro-chemical current producing cell comprising an anode consisting of an alkali or an alkali-earth metal, a cathode, a separator (diaphragm separating the cathode from the anode) and an electrolyte based on an organic solvent (U.S. Pat. No. 3,578,500).

The most preferred material for the anode, as specified in the above patent, is metallic lithium. As the cathode active material (depolarizer), this cell employs such quaternary salts of organic amines, said salts being soluble in the electrolyte, as for example, N,N,N',N'-tetramethyl diimoniumdiphenoquinone diperchlorate; the tetra cation of N,N,N',N'-tetra-(p-diethylaminophenyl)-p-phenylenediamine; complexes of metals with several common oxidation states; 9,10-phenanthroline ferrous perchlorate; ditrifluoromethyl ethylene dithiolato Ni, Cr, Co; tetracyano ethylene; sulfuryl chloride.

By "active material" is meant an individual substance or a portion thereof, which is directly subjected to electro-chemical redox conversion in the current-forming reaction.

Cathode active materials are dissolved in an organic solvent, said solvent being sulfur dioxide under superatmospheric pressure or dissolved in one of cosolvents. Organic compounds of the elements of groups IIIA, IVA, VA, VIA of the periodic system, comprising one or two unshared pairs of electrons, i.e. ethers, amines, carbonates, etc. are utilized as cosolvents.

The electrolyte based on liquid sulfur dioxide or on sulfur dioxide comprising an organic cosolvent, further comprises a light metal salt, preferably lithium perchlorate and halogenide. Besides, lithium salts of such organic acids as trichloroacetic, formic etc. may be utilized. To prepare an electrolyte in the case of utilization of a cosolvent, a solution of a salt in an organic solvent is saturated with sulfur dioxide under atmospheric or superatmospheric pressure.

The separator element separating the cathode from the anode and obstructing a direct chemical reaction between lithium and a dissolved depolarizer, is a passivating film forming under direct interaction between sulfur dioxide and the anode. This passivating film functions like an ionopenetrable separator. Thus, sulfur dioxide presents the main integral component of such a cell. Along with a chemically formed separator, in the above patent there is also used a Dacron separator to achieve mechanical separation of the cathode from the anode.

Said electro-chemical current producing cell employing a dissolved depolarizer, can operate essentially as a primary power supply, and is much worse when used as a secondary power supply.

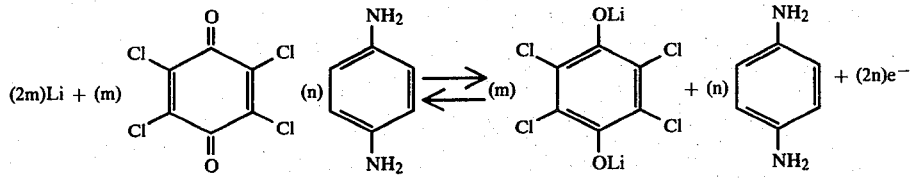

Primary power supply means an irreversible cell (battery) designed for one-time use. Secondary power supply means a reversible current producing cell (storage battery) designed for repeated use.

Maximum number of discharge-charge cycles, specified in said patent for such cells, is 8. Electromotive force of the above described electro-chemical current producing cells, depending on the nature of a depolarizer, varies essentially within the range of 2.85 V to 3.85 V, and in two extremal cases is of 3.9 V and 4.0 V. The latter magnitudes are achieved in the case of employing a dication of tetramethyl benzidine. For other systems, the value of electromotive force is much lower.

Employing liquid sulfur dioxide as a solvent in said chemical power supplies imposes some restrictions. First of all, it is a limitation of operating temperature conditions. Since the boiling point of the solvent (sulfur dioxide) is of $-10°$ C., such a cell can operate only at low temperatures, or at higher temperatures under pressure. Moreover, the operating temperature conditions and high toxicity of sulfur dioxide require complex technology, special materials for manufacturing the cell, and certain conditions for its storage and performance. To avoid the explosion of the cell, a special device is to be installed therewithin. The above considerations limit mass application of said cells for domestic purposes.

Furthermore, in numerous chemical reactions sulfur dioxide acts as a reducer, which results in a rather limited choice of cathodes (oxidizers) possessing a high oxidizing potential. Besides, sulfur dioxide reacts with the anode material which fact reduces the service life of the cell.

When using organic cosolvents along with sulfur dioxide, there also arises a need in preliminary passivation of the anode by repeated passing large amounts of sulfur dioxide through the cell. Since in said cell one of the electrodes, i.e. the anode is a solid, the discharge-charge process for such a cell is associated with changing the electrode volume, thereby leading to breakdown of the passivating film which is formed by sulfur dioxide and is a separator. The above fact results in exhaustion of the sulfur dioxide content in the solvent and finally leads to a decrease in capacity, in the number of discharge-charge cycles, and in rapid failure of the current producing cell due to a direct inner reaction between the anode and the depolarizer. Furthermore, since cosolvents employed in the cell are complex organic electron-donor solvents possessing an exclusively low ionization potential, selection of depolarizers having a high oxidizing potential in such solvents to employ said depolarizers as active materials in similar current producing cells, is rather limited.

An important condition of effective operation of said electrochemical current producing cell is also solubility both of oxidized and reduced forms of the depolarizer. However, such most acceptable cathode active materials, specified in the above patent, as organic dications of N,N,N',N'-tetramethyl benzidine, do not meet the above requirements since the products of their reduction are insoluble in the electrolytes being utilized, thereby blocking the cathode and eliminating further electrochemical reaction. This, in turn, leads to a sharp increase in the inner resistance of the cell, thereby significantly lowering the density of the current being collected, excessively increasing charging time, and converting the secondary current producing cell into the primary one, the coefficient of utilization of the cathode active materials being low and a loss of initial capacity being present. Moreover, dications of organic quaternary nitrogen salts in themselves and the more so in nucleophilic media employed in the cell, possess low stability thereby further reducing the number of discharge-charge cycles. Besides, low stability of such organic dications leads to the losses in the capacity of the cell in terms of time, and lowers the shelf life of the cell. The limited range of more or less stable well-known organic dications of quaternary nitrogen derivatives, and of other organic compounds restricts the possibility of selecting these substances as cathode active materials, while the low solubility thereof in the employed electrolytes prevents the development of cells possessing considerable specific capacity. Moreover, high affinity of these dications to nucleophilic reagents restricts the possibility of selecting basic media employed as cosolvents.

A further important limitation in employing such current producing cells is caused by their explosion hazard with moisture getting into the cell, and by the complex technology of manufacturing such cells, which technology requires the presence of constantly inert atmosphere, the absence of moisture, oxygen, and the presence of sulfur dioxide.

SUMMARY OF THE INVENTION

The main object of the present invention is to provide a chemical power supply possessing high performance properties due to increasing electromotive force and the number of discharge-charge cycles, with simultaneous expanding the field of application thereof.

The object set forth and other objects pf the present invention are attained by that a chemical power supply comprises a cathode and an anode including active materials dissolved in an electrolyte based on an organic solvent, and a diaphragm separating, said cathode from said anode, said cathode active material being a stable radical selected from the group consisting of a stable cation-radical of an aromatic amine, a stable cation-radical of a heterocyclic compound, a stable electrically neutral radical of an aromatic oxygen-containing compound, a stable electrically neutral radical of an aromatic nitrogen-containing compound, while said anode active material is a stable anion-radical of an aromatic compound.

Employing said stable radicals as cathode and anode active materials permits obtaining numerous advantages as compared to the prior art current producing cells. The main of the above advantages are the following: increasing electromotive force, complete reversibility of discharge-charge cycles ensuring the possibility of developing a secondary power supply possessing practically unlimited number of discharge-charge cycles which, in turn, permits long-term repeated use of such a cell. The chemical power supply of the invention, due to utilization of said stable radicals in combination with various readily available and cheap solvents, can operates under atmospheric pressure without any supplementary devices, thereby providing for the possibility of using said supply within a wide range of positive and negative temperatures.

In the operation of such a chemical power supply, gaseous products are not liberated, thereby permitting said supply to be made in a hermetically sealed enclosure.

Due to its specific features, the power supply can be stored both under conventional conditions (room temperature, atmospheric pressure) and in a wide range of positive and negative temperatures without occurrence of any changes in its initial characteristics, for a very long period of time.

The inventive chemical power supply does not require special technology for preparing solid electrodes from an oxidizer or a reducer, thereby allowing an exclusively high coefficient of utilization of active masses to be obtained. In manufacturing such a chemical power supply, application of scarce or high toxicity materials for the cathode, the anode, and the electrolyte, is eliminated.

Moreover, the manufacture of such a power supply may not require the presence of an inert medium and of a highly toxic sulfur dioxide during the assembly operation, thereby considerably simplifying the technological process. Compared to the prior art power supplies employing the lithium anode, the inventive chemical power supply is not dangerously explosive in the case when water gets thereinto, thereby considerably expanding field of application thereof.

The above advantages and other important advantages of the present invention will be explained in more detail in the description of operation of the power supply of the invention.

By "stable radicals" are meant particles having on the upper molecular orbital thereof an unpaired electron which fact stipulates some specific properties differing from the properties of related electrically neutral molecules, anions and cations. In the common case, stable radicals are subdivided into anion-, cation- and electrically neutral radicals. Stable anion-radicals ($A^{\bar{\circ}}$) are the particles which, apart from an unpaired electron, possess a negative charge. Such particles are generally obtained either by single-electron electrochemical or by chemical reduction of electrically neutral molecules in the medium of polar organic solvents.

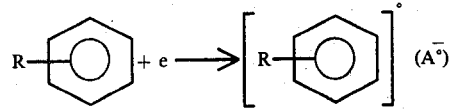

Due to the availability of an "excessive" unpaired electron, stable anion-radicals, unlike corresponding electrically neutral molecules, possess very much more pronounced reduction properties.

Along with exclusively high reduction properties stable anion-radicals, unlike the corresponding anions or dianions, are characterized by a higher stability both in a solid state and in solutions of numerous polar organic solvents. Moreover, it is especially important that such stable anion-radicals possess high solubility in said solvents. The solubility of said stable anion-radicals in such solvents as dimethoxy ethane or tetrahydrofurane reaches several moles per liter, the solubility of their oxidized forms (corresponding electrically neutral molecules) being of the same order.

Stable cation-radicals ($K^{\bar{\circ}}$) are the particles wherein from the upper molecular orbital there is withdrawn one electron:

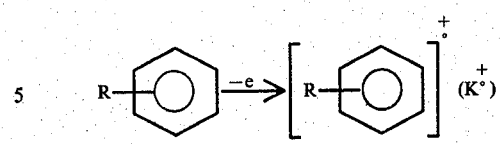

Stable cation-radicals are generally obtained either by single-electron electrochemical oxidation of neutral molecules at the anode, or by chemical single-electron oxidation with such oxidizers as ions of metals with several common oxidation states, halogenides and the like. Unlike corresponding electrically neutral molecules, stable cation-radicals, due to electron deficiency, possess a higher oxidation potential and can effectively oxidize various organic and inorganic substrates.

As well as stable anion-radicals, said stable cation-radicals, compared to corresponding cations and dications, are characterized by a higher stability both in the solid state and in solutions of polar organic solvents, the solubility both of oxidized and reduced forms being very high (from one to several moles per liter). Thus, for instance, a stable cation-radical of tri-p-tolyl amine in the solid state and in the solutions of numerous organic solvents can exist for a long time without any changes, while dication of this compound practically instantaneously decomposes irreversibly and cannot be separated in the individual form. An extremely low stability of dications as against corresponding said stable cation-radicals is characteristic not only of substituted triphenyl amines, but also of other aromatic derivatives such as polycyclic hydrocarbons, nitrogen-containing and sulfur-containing heterocyclic compounds and the like. At the same time many cation-radicals of these compounds are substantially stable and can be separated in the individual form.

Electrically neutral stable radicals are particles having an unpaired electron but bearing no charge. Such particles are usually obtained by either chemical or electrochemical oxidation of corresponding electrically neutral molecules whose oxidation proceeds with breakaway of an atom of hydrogen:

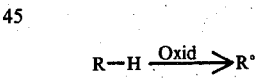

Such radicals usually possess peculiar "amphoteric" properties and depending on their structure, can act both as oxidizers and as reducers. This class of stable radicals is also characterized by high solubility in oxidized and reduced forms, in polar organic solvents.

Along with high redox characteristics of said stable electrically neutral cation- and anion-radicals, and with significant solubility of their redox forms in polar organic solvents, it is of special importance and practical value that electrochemical processes involving these substances proceed rapidly and are fully reversible.

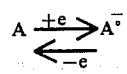

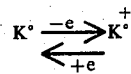

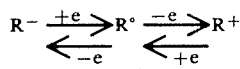

The products of these reactions are stable and soluble in organic solvents.

In operation of such an electro-chemical current producing cell, the current producing reaction consists in oxidation of a reducing radical ($A^{\bar{\cdot}}$) i.e. the anode active material, with an oxidation radical ($K^{\dot{+}}$), or $R\cdot$ being the cathode active material.

$$A^{\bar{\cdot}} + K^{\dot{+}} (R\cdot) \rightarrow A + K(R^{-})$$

where
- $A^{\bar{\cdot}}$ is a stable anion-radical,
- $K^{\dot{+}}$ is a stable cation-radical,
- $R\cdot$ is a stable electrically neutral radical.

The process of charging such a chemical power supply proceeds in accordance with the reverse reaction: within the anode space there occurs reduction of the electrically neutral molecule

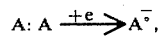

while within the cathode space there occurs oxidation of the electrically neutral molecule K or of the anion

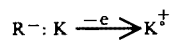

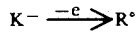

As can be seen from the above, corresponding starting stable radicals are again completely electrochemically regenerated.

The application of said stable cation- or electrically neutral radicals in combination with said stable anion radicals permits substantial increasing performance properties of the chemical power supply.

Physicochemical studies into operation of such power supplies have demonstrated that the process of discharging and charging such a power supply is associated only with transfer of an electron which does not cause further irreversible chemical transformations of the active materials, while the particles being formed thereby possess high stability and solubility in the electrolyte, the reverse regeneration of the particles involved in the current-forming reaction proceeding in terms of quantity in the charging process. Due to the above fact, such as chemical power supply based on redox transformations of said stable radicals, is capable of withstanding an unlimited number of discharge-charge cycles unlike the chemical power supplies wherein electrically neutral molecules and complexes thereof, or a series of organic dications are employed as cathode active materials.

Since in such a power supply, unlike the prior art devices, both the components of active materials (stable radicals) of the cathode and the anode are completely dissolved in the electrolyte, this does not require any special technology of producing solid electrodes from the oxidizer and the reducer (suspending, introducing a filler and a binder, forming etc.). In addition, the discharge-charge process of the chemical power supply is not associated with electrochemical formation, electrocrystallization and mass transfer of solid electrodes, and consequently does not affect the variation of area, surface condition and volume of the electrodes. This fact provides for the possibility to maintain for a long time the power capacity, the number of discharge-charge cycles, the time of power supply operation under constant initial characteristics, and to accomplish the discharge-charge operation in the maximum current mode, thereby making it possible to substantially cut down the charging time.

High solubility both of discharging products and of charging products in the electrolytes based on the organic solvents indicated below and a great difference of redox characteristics of active materials of the cathode and the anode, and of the products of their discharging, which results in shifting the equilibrium of the redox current-forming reaction practically completely in the direction of the discharging products, permits to the achievement of essentially complete utilization of the active masses of the cathode and of the anode, thereby obtaining an exclusively high coefficient of utilization thereof.

At the same time, utilization of soluble cathode and anode substances permits the effective use in this power supply of porous electrodes having high specific surface which results in a significant increase in the current collection and in the power of the source.

Application of said stable radicals in the proposed power supply, which radicals possess sufficient solubility and stability within a wide set of such organic solvents as ethers, nitriles, nitro derivatives and mixtures thereof having low freezing points and high boiling points, makes it possible to use the power supply under atmospheric pressure within a wide range of positive and negative temperatures.

As it follows from the specification, in the process of discharging and charging the power supply, there does not occur liberation of any gaseous products, therefore the given power supply can be manufactured in a hermetically sealed enclosure. Unlike the prior art lithium cells, this power supply is not dangerously explosive in the case where moisture or water get thereinto, since the cathode and the anode active materials react with water without liberation of hydrogen and other gaseous products.

Since the discharging products in said power supply are airresistant electrically neutral organic molecules (for instance, naphthalene in the anode space, and tri-p-tolyl amine in the cathode space), it can be assembled under conventional conditions in the air with subsequent blowing-through using an inert gas, and hermetic sealing which results in substantial simplification of the technology of manufacturing said power supply as against the prior art cells.

Due to the high air-resistance of discharging products of the reversible chemical power supply based on said stable cation- and anion-radicals, such a power supply can be stored in the discharged state for dozens of years without any changes in the initial characteristics thereof.

It is recommended to employ a stable cation-radical of tri-p-tolyl amine, or a stable cation-radical of N,N,N',N'-tetramethyl benzidine, or a stable cation-radical of tri-p-bromotriphenyl amine as a stable cation-radical of an aromatic amine.

Said stable cation-radicals possess a high oxidizing potential, complete reversibility and exclusive stability, thereby permitting to achieve maximum effect in terms of electromotive force and the number of discharge-charge cycles.

It is expedient to employ a stable cation-radical of N,N'-dimethylphenazine, or a stable cation-radical of N,N'-diphenyl phenazine, or a stable cation-radical of N-methyl phenothiazine, or a stable cation-radical of thianthrene as a stable cation-radical of a heterocyclic compound.

The first three of said stable cation-radicals are chemically inert in the majority of accessible cheap non-toxic polar organic solvents and provide for the possibility of varying the choice of organic solvents utilized for electrolytes, within a wide range. The latter stable cation-radical from this class of heterocyclic compounds possess the highest oxidation potential, which is of especial value for designing high-voltage power supplies.

It is possible to employ a stable electrically neutral radical of 2,6-di-tertbutyl-4-(2',6'-di-tertbutylquinobenzyl)-phenoxyl, or a stable electrically neutral radical of 2,2',6,6'-tetra-tertbutylindophenoxyl as a stable electrically neutral radical of an aromatic oxygen-containing compound.

In contrast to some other phenoxyl radicals, said stable electrically neutral radicals are not subject to spontaneous transformations (e.g. dimerization, disproportionation and the like), and possess a high stability in many, not only polar, but also in low-polarity solvents. Furthermore, said phenoxyl radicals when employed as active materials of anodes having a high reduction potential, can be sequentially and reversibly reduced to an anion, an anion-radical and a dianion with transfer of three electrons, thereby significantly increasing the specific capacity of the power supply.

It is preferred to employ a stable electrically neutral radical of diphenylpicrylhydrazyl, or a stable electrically neutral radical of triphenylverdozyl, as a stable electrically neutral radical of an aromatic nitrogen-containing compound.

Said stable radicals possess the highest stability both in the solid state and in the solution with known electrically neutral radicals of said class of compounds, and are characterized by a relatively simple synthesis procedure, triphenylverdozyl radical being capable to be successfully employed not only as the cathode active material, but as the authors have found, as the anode active material in combination with the above-mentioned cation- and electrically neutral radicals since electrochemical oxidation thereof to a corresponding stable and soluble cation proceeds in the reversible manner.

It is most preferred to employ a stable anion-radical of naphthalene, or a stable anion-radical of anthracene, or a stable anion-radical of an aromatic compound.

The above mentioned stable anion-radicals from the selected anionradicals of such a class possess high reduction potentials, stability, small mass and are the most preferred for developing high-voltage reversible power supplies having a large number of discharge-charge cycles. The combination of these stable anion-radicals with stable cation-radicals and with electrically neutral radicals ensures the highest parameters of the inventive power supplies.

DETAILED EXPLANATION OF THE INVENTION

A chemical power supply of the invention comprises a cell closure constructed from a material being chemically inert to an oxidizer and to a reducer.

The cell closure is divided into cathode and anode spaces by a semipermeable separator element which is capable of freely conducting inorganic ions of an electrolyte while completely retaining stable radicals. Within the cathode and anode spaces there is disposed one and the same electrolyte consisting of an organic solvent and inorganic salt dissociated therewithin. A radical-reducer is dissolved within the anode space, while within the cathode space there is dissolved a radical-oxidizer. Current collection is accomplished by means of metallic or graphite electrodes immersed into the solution contained within the cathode and anode spaces. Such a chemical power supply may be constructed in the form of buttons, cylinders, plates and parallelepipeds. Many other modifications of power supplies of this type which can be designed, are evident and are not included into the present invention which is not directed to any detailed structure of the chemical power supply. Said power supply is so designed that it can be made hermetically sealed to prevent atmospheric moisture and oxygen from getting thereinto.

The structure of the cell enclosure (outer shell) widely uses such various available materials inert to chemical attack as glass, polyethylene, high pressure polypropylene, polytetrafluoroethylene (teflon) and numerous other plastics.

Semipermeable diaphragm, depending on sizes of stable radicals and their solvation shells, may be constructed from known selective ion-conductive separators made from polymers and copolymers based on vinyl chloride, vinyl acetate, nylon, glass filter paper, cellophane, alumina and natural ceramic separators. There may be also used separators based on zeolites having selective volume of pores, semipermeable polymeric separators produced by radiation and bombardment with nuclei of heavy metals, and some other materials.

Said chemical power supply employs a solution of an inorganic or an organic salt in any organic solvent. To achieve successful application of organic solvents in such a power supply, it is necessary that said solvents be, first of all, chemically compatible with cathode and anode active materials represented by stable radicals. For this end, solvents must possess a low reduction potential while being resistant to such strong oxidizers as stable cation- or electrically neutral radicals which are applied as cathode active materials. Moreover, the organic solvent must readily dissolve stable cation-, anion- and electrically neutral radicals and their oxidized and reduced forms.

Furthermore, the solvent is to be compatible with other components of the power supply, i.e. the enclosure, an inorganic or an organic salt used as a supporting electrolyte, materials of current collecting electrodes. The solvent also must readily dissolve a salt of the supporting electrolyte, and is to be in the liquid state within a wide range of positive and negative temperatures, while being relatively cheap, nontoxic or low-toxic.

The following classes of organic solvents meet these requirements: carboxylic esters (ethyl acetate), dialkyl carbonates (diethyl carbonate), alkyl carbonates (propylene carbonate), aliphatic polyesters (glyme, diglyme), aliphatic cyclic mono- and polyesters (tetrahydrofuran, dioxane), alkoxylanes (methyl trimethoxylane), alkylnitriles (acetonitrile, propionitrile and the like), dialkyl amides (dimethylformamide), pyridine, p-methylpiperidine, and probable mixtures of above mentioned solvents. Naturally, the above examples of solvents are not complete since the power supply of the invention may also employ other equivalent solvents meeting the above specified criteria.

We have found that among the above described solvents, such ones as tetrahydrofuran, acetonitrile, propylene carbonate and dimethoxy ethane are the most preferred solvents for use in said chemical power supply.

To reduce inner resistance of the chemical power supply and to normalize performance conditions (to obtain optimum current characteristics), an inorganic or an organic salt in the organic solvent presents a critical condition to meet this requirement. Perchlorates, tetrachloroaluminates and tetraborofluorates of alkali and alkali-earth metals can be used as these salts. Apart from these salts, satisfactory results can be obtained with salts of such organic acids as trifluoroacetic, trichloroacetic, oleic, stearic, valeric and the like, and salts of sulfo acids. Cations of such salts are usually represented by Li, Na, K. Among these salts the most preferred are perchlorates, tetrafluoroborates and tetrachloroaluminates of lithium and sodium due to their high dissociation, conductivity and inertness to other components of the power supply. To achieve maximum decrease in the inner resistance of the power supply, a combination of several salts leading to an increase in their mutual solubility and dissociation is also possible. The concentration of the salt may be varied in each specific case depending on the required electroconductivity of the power supply electrolyte.

Cathode and anode active materials may be represented by stable electrically neutral radicals and by ion-radicals of various classes.

It is most preferred to utilize as cathode active materials a stable cation-radical of tri-p-tolyl amine, or a stable cation-radical of N,N,N',N'-tetramethyl benzidine, or a stable cation-radical or tri-p-bromotriphenyl amine, or a stable cation-radical of N,N'-dimethylphenazine, or a stable cation-radical of N,N'-diphenyl phenazine, or a stable cation-radical of N-methyl phenothiazine, or a stable cation-radical of thianthrene. Among stable electrically neutral radicals, it is most expedient to employ a stable electrically neutral 2,6-di-tertbutyl-4-(2',6',-di-tertbutylquinobenzyl)-phenoxyl, or a stable electrically neutral radical of 2,2',6,6'-tetra-tertbutylindophenoxyl, or a stable electrically neutral radical of diphenylpicrylhydrazyl, or a stable electrically neutral radical or triphenylverdozyl.

A stable anion-radical of naphthalene, or a stable anion-radical of anthracene, or a stable anion-radical of benzophenone is expedient to be utilized as anode active materials.

The number of dissolved cathode and anode active materials being stable radicals may vary within a wide range, however usually it is used such a number that the cathode capacity correspond that of the anode.

Corresponding ratios between an electrolyte salt and active materials, being stable radicals, are selected depending on the solubility of ingredients in the chosen organic solvent at the room temperature.

The current collecting electrodes in the above power supply may be represented by any conductors being inert to the electrolyte and to anode and cathode active materials, i.e. free radicals. These materials are metals of the platinum group including platinum, iridium, osmium, palladium, rhodium, ruthenium and the like. Along with the above metals, there may be also utilized carbon in various modifications thereof, stainless steel, nickel, chromium, and such inorganic materials as boron nitride and silicium-based semiconductors.

It is also proposed to employ various combinations of solid current collecting electrodes, i.e. different electrodes within cathode and anode spaces, which permits not only to optimize electromotive force, and current characteristics of the power supply, but also to utilize practically all the existing metals and their alloys as electrodes. These materials can be used in various shapes which are generally accepted in the manufacture of power supplies (plates, rods, powders, pastes etc.).

Among the above listed materials, the most preferred electrodes are porous carbon (graphite), platinized porous carbon, sponge platinum, palladium and other porous metals having an exclusively large surface area per gramm weight. The advantage of such sponge electrodes over smooth rods, plates and discs lies first of all in the fact that such electrodes permit a substantial increase in the effective power of the supply, i.e. make it possible to pick off more current per unit time with small dimensions of the power supply.

Due to the high resistance of the products of discharge of the active materials against moisture and oxygen contained in the air, assembling such an element can be accomplished under conventional conditions in the air with subsequent withdrawal of the atmospheric air prior to sealing and charging the power supply. This modification of the power supply is preferred compared to the modification where all the assembling operations are carried out in the inert gas atmosphere.

The invention is further explained in terms of specific examples.

EXAMPLE 1

A chemical power supply of the invention comprises a cathode active material being a stable cation-radical of tri-p-bromotriphenylamine

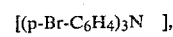

an anode active material being a stable anion-radical of naphthalene, while an electrolyte is tetrahydrofuran containing

dissolved therein.

Said chemical power supply was made as follows.

At first, hexachloroantimonate of cation-radical of tri-p-bromotriphenyl amine [(p-Br-C6H4)3N ClO4−] was prepared. For this purpose, tri-p-bromotriphenyl amine in an amount of 0.01 mole was dissolved in 10 ml of CH2Cl2 following which a solution containing 0.015 mole of SbCl5 in 10 ml of CH2Cl2 was added thereto in drops with ice cooling. The solution turned blue which is typical for the cation-radical of tri-p-bromotriphenyl amine. After 10 minutes, upon mixing the solutions, diethyl ether in an amount of 50 ml was poured into the reaction mixture. Dark violet crystals of hexachloroantimonate of a cation-radical of tri-p-bromotriphenyl amine precipitated, said crystals were filtered out on a glass filter, flushed with cold ether and vacuum-dried. The crystals of a cation-radical salt of hexachloroantimonate of tri-p-bromotriphenyl amine were reprecipitated several times from $CH_2Cl_2$ by the ether to achieve additional purification. The yield was 96%.

Next, a sodium salt of an anion-radical of naphthalene was prepared. For this purpose, 0.1 mole naphthalene was dissolved in 300 $cm^3$ dry tetrahydrofuran. The resulting solution was blown through with argon, and 0.1 mole freshly cut metallic sodium was added thereto. The resulting mix was intensively stirred during several hours, coloring the solution into the typical for a stable anion-radical of naphthalene dark green color being observed. After sodium had been completely dissolved, the solvent was vacuum-distilled to obtain a solid sodium salt of anion-radical of naphthalene. A dark green crystalline powder was obtained. The yield was 98%.

Purification and drying tetrahydrofuran for preparing an electrolyte, were carried out in accordance with the following procedure.

Tetrahydrofuran was first boiled for several hours together with $CH_2Cl_2$ (in an amount of 20 g per 1 l tetrahydrofuran). Then it was distilled and repeatedly boiled several times over KOH (in an amount of 50 g per 1 l of tetrahydrofuran). Thereby cleaned tetrahydrofuran was dried by boiling over the freshly cut metallic sodium, then over sodium hydride, and was fractionated in a flow of argon.

An electrolyte was prepared by dissolving dry $NaClO_4$ in purified and dried tetrahydrofuran. Hexachloroantimonate of a cation-radical of tri-p-bromotriphenyl amine and a sodium salt of anion-radical of naphthalene were dissolved in the given electrolyte. The resulting solutions were used as active solutions in the chemical power supply.

EXAMPLE 2

A chemical power supply of the invention comprises:
cathode active material—a stable cation-radical of tri-p-tolyl amine $(p-CH_3C_6H_4)_3N^{\ddagger}$,
anode active material—a stable anion-radical of naphthalene,
electrolyte—tetrahydrofuran containing $LiClO_4$ dissolved therein (concentration being of 0.5 mole/l).

Said chemical power supply was made as follows.
At first, perchlorate of a cation-radical of tri-p-tolyl amine $(p-CH_3C_6H_4)_3{}^{\ddagger}ClO_4^-$ was prepared.

A solution containing 2.9 g dry silver perchlorate and 2.87 g tri-p-tolyl amine in 250 $cm^3$ absolute ether was cooled with dry ice in a flask provided with a pipe containing $CaCl_2$. Next, with continuous stirring during 10 minutes, 2.0 g iodine was added to said solution and the resulting mix was intensively stirred during 45 minutes. In doing so, the mix temperature was increased up to the room temperature. The resulting mix was filtered out. The precipitated cation-radical salt was dissolved with chloroform by flushing on a filter. The solution thus obtained was poured into 250 $cm^3$ ether and was cooled. Thereby cleaned cation-radical salt of tri-p-tolyl amine was filtered out and dried. 3.5 g of red-bronze crystals of cation-radical salt $(p-CH_3C_6H_4)_3N^{\ddagger}ClO_4^-$ were obtained.

Next, a sodium salt of an anion-radical of naphthalene was obtained using the procedure specified in Example 1.

An electrolyte was prepared by dissolving dry $LiClO_4$ in tetrahydrofuran which was purified and dried according to the procedure specified in Example 1.

Perchlorate of cation-radical of tri-p-tolyl amine and a sodium salt of anion-radical of naphthalene were dissolved in the given electrolyte. The solutions thus obtained were used as active solutions in the chemical power supply.

EXAMPLE 3

A chemical power supply of the invention comprises:
cathode active material—stable cation-radical of tri-p-tolyl amine $(p-CH_3-C_6H_4)_3N^{\ddagger}$,
anode active material—stable anion-radical of naphthalene,
electrolyte—tetrahydrofuran containing $LiBF_4$ dissolved therein (concentration being of 0.1 mole/l).

Said chemical power supply was made as follows.
At first, tetrafluoroborate of cation-radical of tri-p-tolyl amine $(p-CH_3-CH_6H_4)_3N^{\ddagger}BF_4^-$ was prepared. For this purpose, 0.001 mole of tri-p-tolyl amine was dissolved in 200 $cm^3$ actonitrile which had been dried by repeated boiling over $P_2O_5$. This solution was admixed, while continuously blowing with argon during 30 minutes, with a solution of 0.001 mole of $NOBF_4$ in 50 $cm^3$ $CH_3CN$. After all of $NOBF_4$ had been added, the solution was further blown through during 20 minutes to remove nitrogen oxide. Next, the solvent was removed under reduced pressure, and the solid residue was repeatedly precipitated from $CH_2Cl_2$ by diethyl ether. Dark blue crystals of tetrafluoroborate of cation-radical of tri-p-tolyl amine were obtained. The yield was 90%.

Following this, a sodium salt of anion-radical of naphthalene was obtained in accordance with the technique specified in Example 1.

An electrolyte was prepared by dissolving dry $LiBF_4$ in tetrahydrofuran which was purified and dried according to the technique specified in Example 1.

Tetrafluoroborate of cation-radical of tri-p-tolyl amine and a sodium salt of anion-radical of naphthalene were dissolved in the given electrolyte. The solutions thus obtained were used as active solutions in the chemical power supply.

EXAMPLE 4

A chemical power supply of the invention comprises:
cathode active material—a stable cation-radical of tri-p-tolyl amine $(p-CH_3-C_6H_4)_3N^{\ddagger}$,
anode active material—a stable anion-radical of naphthalene,
electrolyte-tetrahydrofuran containing LiCl dissolved therein (concentration being of 0.1 mole/l).

Said chemical power dupply was made as follows.
At first, hexachloroantimonate of cation-radical of tri-p-tolyl amine $(p-CH_3-C_6H_4)_3N^{\ddagger}SbCl_6^-$ was prepared. For this purpose, 0.01 mole of tri-p-tolyl amine was dissolved in 10 ml $CH_2Cl_2$ following which a solution containing 0.015 mole $SbCl_5$ in 10 ml $CH_2Cl_2$ was added thereto in drops with dry ice cooling. Further steps were carried out as specified in Example 1. Dark violet crystals of hexachloroantimonate of tri-p-tolyl amine were obtained. The yield was 95%.

Next, a sodium salt of anion-radical of naphthalene was obtained in accordance with the technique specified in Example 1.

An electrolyte was prepared by dissolving dry LiCl in tetrahydrofuran which was purified and dried according to the technique specified in Example 1.

Hexachloroantimonate of cation-radical of tri-p-tolyl amine and a sodium salt of anion-radical of naphthalene were dissolved in the given electrolyte. The resulting solutions were used as active solutions in the chemical power supply.

EXAMPLE 5

A chemical power supply of the invention comprises:

cathode active material—a stable cation-radical of tri-p-bromotriphenyl amine, $(p\text{-}Br\text{-}C_6H_4)_3N^{\overset{+}{\cdot}}$, anode active material—a stable anion-radical of anthracene, electrolyte—tetrahydrofuran containing $NaClO_4$ dissolved therein (concentration being of 1 mole/l).

Said chemical power supply was made as follows.

At first, hexachloroantimonate of cation-radical of tri-p-bromotriphenyl amine $[(p\text{-}Br\text{-}C_6H_4)_3N^{\overset{+}{\cdot}} \; SbCl_6]$ was obtained.

Said substance was prepared in accordance with the technique specified in Example 1 by oxidizing a corresponding electrically neutral amine by means of $SbCl_5$.

For this purpose, 2.4 g of tri-p-bromotriphenyl amine were dissolved in 10 $cm^3$ methylene chloride. The solution was cooled, and a solution of $SbCl_5$ in 10 $cm^3$ $CH_2Cl_2$ was added thereto slowly in drops.

After the reaction had been over, the solution of thus formed cation-radical was poured into dry ether (30 $cm^3$). Further treatment of precipitated crystals of hexachloroantimonate of cation-radical of tri-p-bromotriphenyl amine was carried out as specified in Example 1. The yield of the end product was 95%.

Next, a sodium salt of anion-radical of anthracene was obtained in accordance with a procedure similar to that specified in Example 1. Sublimated anthracene in an amount of 3.6 g was dissolved in 150 $cm^3$ of tetrahydrofuran. The solution was blown through with argon, and 0.6 g of freshly cut sodium was added thereto. Further steps were accomplished as specified in Example 1. The yield of the sodium salt of anion-radical of anthracene was 87%.

An electrolyte was prepared by dissolving dry $NaClO_4$ in tetrahydrofuran which was cleaned and dried according to the technique specified in Example 1.

Hexachloroantimonate of cation-radical of tri-p-bromotriphenyl amine and a sodium salt of anion-radical of anthracene were dissolved in the given electrolyte. The solutions thus obtained were used as active solutions in the chemical power supply.

EXAMPLE 6

A chemical power supply of the invention comprises:

cathode active material—a stable cation-radical of thianthrene

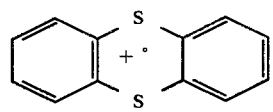

, anode active material—a stable anion-radical of benzophenone, electrolyte—acetonitrile containing $NaClO_4$ dissolved therein (concentration being of 0.8 mole/l).

Said chemical power supply was made as follows.

At first, perchlorate of cation-radical of thianthrene

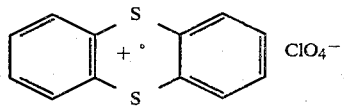

was obtained. For this purpose, 1.29 g of sublimated thianthrene were dissolved in 150 $cm^3$ of hot acetic anhydride, and a solution of 1.8 $cm^3$ of 70% $HClO_4$ in 200 $cm^3$ of acetic anhydride was added slowly in drops to the first solution. The resulting solution colored rapidly into reddish brown which is characteristic of perchlorate of cation-radical of thianthrene. The cooled solution was added with 300 $cm^3$ $CCl_4$, and the resulting mix was left for 10–12 hours. Dark brown crystals of perchlorate of cation-radical of thianthrene precipitated. The yield was 72%.

Next, a sodium salt of anion-radical of benzophenone was obtained according to the technique similar to that specified in Example 1, and by electrochemical reduction.

For this purpose, 0.6 g of freshly cut metallic sodium were added, with continuous blowing through with argon, to a solution of 3.6 g of benzophenone in 100 $cm^3$ of dry tetrahydrofuran. The mix was intensively stirred for 4 hours with coloring the solution into dark blue which is characteristic of anion-radical of benzophenone. Further treatment of the mix was carried out as specified in Example 1. Dark violet crystals of a sodium salt of anion-radical of benzophenone were obtained. The yield was 99%.

Described below is the process for preparing anion-radical of benzophenone by electrochemical reduction.

To an electrochemical container divided by a semipermeable barrier from porous glass into cathode and anode spaces, there was poured 0.2 molar solution of $NaClO_4$ in tetrahydrofuran, containing 0.1 mole of benzophenone. An electro-chemical cell provided with platinum electrodes was blown through with argon and was connected to a direct current power supply. The process of electrolysis was carried out at a potential of 2 to 2.5 volts relative to a saturated calomel electrode. The solution turned blue which is characteristic of anion-radical of benzophenone.

Using the given method, it is also possible to obtain in a similar way anion-radicals of other aromatic compounds suitable for the application as an anode material of a chemical power supply, such as anion-radicals of naphthalene, anthracene, nitrobenzene etc.

Cleaning and drying acetonitrile intended for preparing an electrolyte, were accomplished in accordance with the following procedure. Acetonitrile was dried over anhydrous $CaSO_4$ and then was repeatedly boiled over $P_2O_5$ with a backflow condenser which was protected from the influence of atmospheric moisture by means of a tube filled with $P_2O_5$. The process of boiling was repeated until phosphorus pentoxide contained within the distillation flask stopped turning yellow. Following this, acenonitrile was distilled into a vessel containing freshly calcined $K_2CO_3$ to remove traces of $P_2O_5$ and polyphosphoric acids. Then acetonitrile was again distilled from this vessel. Thereby purified $CH_3CN$ was subjected to fractional distillation on a dephlegmator (theoretical number of plates being 15) with withdrawal of medium fraction.

An electrolyte was prepared by dissolving dry NaClO₄ in acetonitrile which was purified and dried in accordance with this procedure.

Perchlorate of cation-radical of thianthrene and a sodium salt of anion-radical of naphthalene were dissolved in the given electrolyte. Solution thus obtained were used as active solutions in a chemical power supply.

EXAMPLE 7

A chemical power supply of the invention comprises:

cathode being a stable cation-radical of N,N,N',N'-tetramethyl benzidine (CH₃)₂-N-C₆H₄-C₆H₄-N⁺ (CH₃)₂, anode being a stable anion-radical of naphthalene, electrolyte being tetrahydrofuran containing LiClO₄ dissolved therein (concentration of 0.5 mole/l).

Said chemical power supply was made as follows:

At first, perchlorate of cation-radical of N,N,N',N'-tetramethyl benzidine (CH₃)₂-N-C₆H₄-C₆H₄-N⁺ (CH₃)₂ClO₄⁻ was obtained. Said substance was prepared according to the procedure specified in Example 2 by reducing a corresponding electrically neutral molecule with silver perchlorate. For this purpose, 2.4 g of N,N,N',N'-tetramethyl benzidine and 2.5 g of AgClO₄ were dissolved in 200 cm³ of an absolute ether. The resulting solvent was cooled, and a solution of 1.5 g of I₂ in a small amount of ether was added thereto in drops. Further steps were similar to those specified in Example 2.

The yield of perchlorate of cation-radical of N,N,N',N'-tetramethyl benzidine was 85%.

Following this, a sodium salt of anion-radical of naphthalene was prepared according to the procedure specified in Example 1.

An electrolyte was prepared by dissolving dry LiClO₄ in tetrahydrofurane whose purification and drying were carried out according to the procedure specified in Example 1.

Perchlorate of cation-radical of N,N,N',N'-tetramethyl benzidine and a sodium salt of anion-radical of naphthalene were dissolved in the given electrolyte. The resulting solutions were utilized as active solutions in the chemical power supply.

EXAMPLE 8

A chemical power supply of the invention comprises:

cathode active material—a stable cation-radical of N,N'-diphenyl phenazine

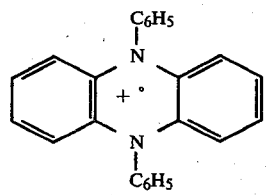

anode active material—a stable anion-radical of naphthalene, electrolyte—tetrahydrofuran containing LiClO₄ dissolved therein (concentration of 0.5 mole/l).

Said chemical power supply was made as follows.

At first, perchlorate of cation-radical of N,N'-diphenyl phenazine

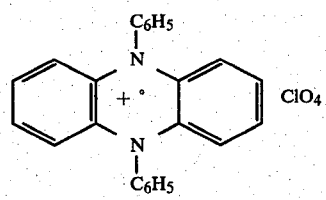

was prepared. Said substances was prepared in accordance with the precedure specified in Example 2.

For this purpose, 2.9 g of dry AgClO₄ and 3 g of N,N'-diphenyl phenazine were dissolved in 250 cm³ of dry ether, following which the solution was cooled, and 1.9 g of iodine dissolved in ether was added thereto. Further treatment and separation of the end product were carried out as specified in Example 2. Dark green crystals of perchlorate of cation-radical of N,N'-diphenyl phenazine were obtained. The yield was 80%.

Next, a sodium salt of anion-radical of naphthalene was prepared in accordance with the procedure specified in Example 1.

An electrolyte was prepared by dissolving dry LiClO₄ in tetrahydrofuran whose purification and drying were carried out according to the procedure specified in Example 1.

Perchlorate of cation-radical of N,N'-diphenyl phenazine and a sodium salt of anion-radical of naphthalene were dissolved in the given electrolyte. The resulting solutions were utilized as active solution in the chemical power supply.

EXAMPLE 9

A chemical power supply of the invention comprises:

cathode active material—a stable cation-radical of N,N'-dimethyl phenazine

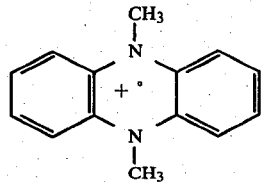

anode active material—a stable anion-radical of naphthalene, electrolyte—tetrahydrofuran containing LiBF₄ dissolved therein (concentration of 0.1 mole/l).

Said chemical power supply was made as follows.

At first, perfluoroborate of cation-radical of N,N'-dimethyl phenazine (tetrafluoroborate)

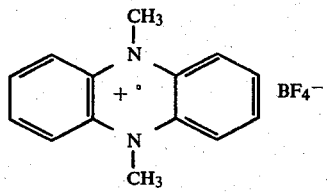

was prepared. Said substance was prepared according to the procedure similar to that specified in Example 3. For this purpose, 0,001 mole of N,N'-dimethyl phenazine was dissolved in 150 cm³ of CH₃CN. The resulting solution was blown through with argon, and 0.001 mole of NOBF₄ dissolved in 50 cm³ of CH₃CN was added thereto. Further treatment and separation of the end product were carried out as specified in Example 3. Dark green crystals of tetrafluoroborate of cation-radical of N,N'-dimethyl phenazine were obtained. The yield was 91%.

Next, a sodium salt of anion-radical of naphthalene was prepared in accordance with the procedure specified in Example 1.

An electrolyte was prepared by dissolving dry LiBF₄ in tetrahydrofuran whose purification and drying were carried out according to the procedure specified in Example 1.

Tetrafluoroborate of cation-radical of N,N'-dimethyl phenazine and a sodium salt of anion-radical of naphthalene were dissolved in the given electrolyte. The resulting solutions were utilized as active solutions in the chemical power supply.

EXAMPLE 10

A chemical power supply of the invention comprises:
cathode active material—a stable cation-radical of N,N,N',N'-tetramethyl-p-phenylene diamine (CH₃)₂N-C₆H₄-N⁺̇ (CH₃)₂,
anode active material—a stable anion-radical of naphthalene,
electrolyte—tetrahydrofuran containing LiClO₄ dissolved therein (concentration of 0.5 mole/l).

Said chemical power supply is made as follows.

At first, perchlorate of cation-radical of N,N,N',N'-tetramethyl-p-phenylene diamine (CH₃)₂N-C₆H₄-N⁺̇ (CH₃)₂ClO₄ was prepared. For this purpose, 4 g of N,N,N',N'-tetramethyl-p-phenylene diamine hydrochloride was dissolved in a solution containing 70 cm³ of H₂O, 115 cm³ of methanol and 50 g of NaClO₄. The resulting solution was cooled down to a temperature of −10° C., and 127 cm³ of a 0.126 N aqueous solution of bromine was added slowly in drops with continuous stirring thereto. Precipitated dark brown crystals of perchlorate of cation-radical of N,N,N',N'-tetramethyl-p-phenylene diamine were filtered, washed several times with methanol cooled by ice, and then were washed with ether. The yield was 70%.

Next, a sodium salt of anion-radical of naphthalene was prepared in accordance with the procedure specified in Example 1.

An electrolyte was prepared by dissolving dry LiClO₄ in tetrahydrofuran whose purification and drying were carried out according to the procedure specified in Example 1.

Perchlorate of cation-radical of N,N,N',N'-tetramethyl-p-phenylene diamine and anion-radical of naphthalene were dissolved in the given electrolyte. The resulting solutions were utilized as active solutions in the chemical power supply.

EXAMPLE 11

A chemical power supply of the invention comprises:
cathode active material—a stable cation-radical of N-methyl phenothiazine

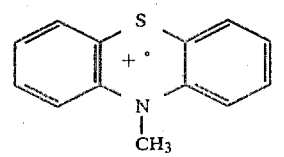

anode active material—a stable anion-radical of naphthalene,
electrolyte—tetrahydrofuran containing LiClO₄ dissolved therein (concentration of 0.5 mole/l).

Said chemical power supply was made as follows.

At first, cation-radical of N-methyl phenothiazine

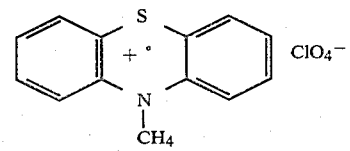

was obtained. Said substance was prepared in accordance with the procedure specified in Example 2. For this purpose, 2.6 g of AgClO₄ and 2.2 g of N-methyl phenothiazine were dissolved in 250 cm³ of dry ether. The resulting solution was cooled with dry ice, and 1.8 g of a solution of I₂ in ether was added thereto. Further treatment and separation of the end product were carried out as specified in Example 2. Dark red crystals of perchlorate of cation-radical of N-methyl phenothiazine were obtained. The yield was 76%.

Next, a sodium salt of anion-radical of naphthalene was prepared in accordance with the procedure specified in Example 1.

An electrolyte was prepared by dissolving dry LiClO₄ in tetrahydrofuran whose purification and drying were carried out according to the procedure specified in Example 1.

Perchlorate of cation-radical of N-methyl phenothiazine and a sodium salt of anion-radical of naphthalene were dissolved in the given electrolyte. The resulting solutions were utilized as active solutions in the chemical power supply.

EXAMPLE 12

A chemical power supply of the invention comprises:
cathode active material—a stable electric neutral radical of diphenylpicrylhydrazyl

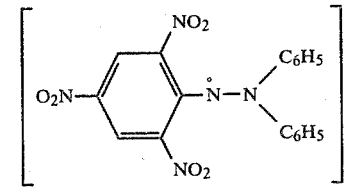

anode active material—a stable anion-radical of naphthalene,
electrolyte—dimethoxy ethane containing LiClO₄ dissolved therein (concentration of 0.5 mole/l).

Said chemical power supply was made as follows.

At first, a stable electric neutral radical of diphenylpicrylhydrazine was prepared. For this purpose, 3 g of diphenylpicrylhydrazine was dissolved in 50 cm³ of purified and dried chloroform. The resulting solution was blown through with argon, and 40 g of $PbO_2$ and 3 g of calcinated $Na_2SO_4$ were added thereto. The flask was closed and was agitated during 3 hours. Following the agitation, the violet solution of an electrically neutral radical of diphenylpicrylhydrazine was separated from the solid phase of an oxidizer by filtering. Major portion of chloroform was evaporated under reduced pressure, and the contents was diluted with a double volume of ether. Dark violet crystals of said radical precipitated. To accomplish additional purification, the crystals were reprecipitated several times with ether from chloroform. The yield was 85%.

Next, a sodium salt of anion-radical of naphthalene was prepared in accordance with the procedure specified in Example 1.

To prepare an electrolyte, purification and drying dimethoxy ethane were carried out as follows. At first, in order to remove peroxides, dimethoxy ethane was boiled for several hours together with $CH_2Cl_2$ following which said dimethoxy ethane was distilled and again boiled 2 times together with solid KOH. Drying the solvent was first carried out by boiling together with freshly cut sodium, and then together with sodium hydride. Then the solvent was fractionated.

An electrolyte was prepared by dissolving dry $LiClO_4$ in dimethoxy ethane. A stable electric neutral radical of diphenylpicrylhydrazine and a sodium salt of anion-radical of naphthalene were dissolved in the resulting electrolyte. The solutions thus prepared were utilized as active solutions in the chemical power supplies.

EXAMPLE 13

A chemical power supply of the invention comprises:
cathode active material—a stable cation-radical of N,N'-dimethyl phenazine

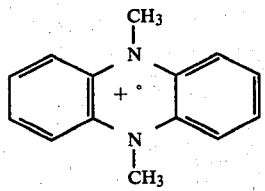

anode active material—a stable anion-radical of naphthalene, electrolyte—dimethoxy ethane containing $LiClO_4$ dissolved therein (concentration of 0.5 mole/l).

Said chemical power supply was made as follows.

At first, perchlorate of cation-radical of dimethyl phenazine

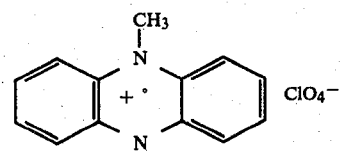

was prepared. This cation-radical was prepared in accordance with the procedure specified in Example 2. For this purpose, 2.6 g of $AgClO_4$ and 2.1 g of N,N'-dimethyl phenazine were dissolved in 250 cm³ of dry ether. The solution was cooled with dry ice, and 1.7 g of a solution containing $I_2$ dissolved in ether was added thereto. Further treatment and separation of a stable cation-radical were carried out as specified in Example 2. Dark green crystals were obtained. The yield was 88%.

Next, a sodium salt of anion-radical of naphthalene was prepared in accordance with the procedure specified in Example 1.

An electrolyte was prepared by dissolving dry $LiClO_4$ in dimethoxy ethane whose purification and drying were accomplished according to the procedure specified in Example 12.

Perchlorate of cation-radical of N,N'-dimethyl phenazine and a sodium salt of anion-radical of naphthalene were dissolved in the given electrolyte. The resulting solutions were utilized as active solutions of the chemical power supplies.

EXAMPLE 14

A chemical power supply of the invention comprises:
cathode active material—a stable electrically neutral radical of 2,6-di-tretbutyl-4-(2',6'-di-tretbutylquinobenzyl)-phenoxyl galvinoxyl, anode active material—a stable anion-radical of naphthalene, electrolyte—tetrahydrofuran containing $NaClO_4$ dissolved therein (concentration of 0.5 mole/l).

Said chemical power supply was made as follows.

At first, electrically neutral radical galvinoxyl was prepared by oxidizing phenol according to methods A and B.

Method A. Bis-(3,5-di-tretbutyl-4-oxyphenyl) methane in an amount of 10 g was dissolved in 300 cm³ of dry diethyl ether. The resulting solution was blown through with argon during 20 minutes. Following this, 100 g of $PbO_2$ was added thereto with intensive stirring. The stirring step was continued for 2 hours. Then the solution was filtered on a glass filter, and the filtrate was evaporated under reduced pressure. The dry residue was three times recrystallized from pentane. Dark violet crystals of electrically neutral radical galvinoxyl was obtained. The yield was 91%.

Method B. Bis-(3,5-di-tretbutyl-4-oxyphenyl) methane in an amount of 10 g was dissolved in 300 cm³ of benzene. The resulting solution was blown through with argon during 20 minutes. Following this, an alkaline solution containing 70 g of $K_3[Fe(CN)_6]$ dissolved in 250 cm³ of water, was added thereto. The resulting mix was again blown through with argon and was agitated during 4 hours. A benzene layer containing galvinoxyl was separated and evaporated under reduced pressure. The solid residue was recrystallized three times from pentane. Dark violet crystals of galvinoxyl were obtained. The yield was 87%.

An anode active material being a sodium salt of anion-radical of naphthalene, was prepared in accordance with the procedure specified in Example 1.

An electrolyte was prepared by dissolving dry $NaClO_4$ in tetrahydrofuran whose purification and drying were carried out according to the procedure specified in Example 1.

Galvinoxyl and a sodium salt of anion-radical of naphthalene were dissolved in the given electrolyte. The resulting solutions were utilized as active solutions in the chemical power supplies.

EXAMPLE 15

A chemical power supply of the invention comprises:

cathode active material—a stable electricall neutral radical of 2,2',6,6'-tetra-tretbutylindophenoxyl

TABLE 1

| Example | 1 | 2 | 3 | 4 | 5 | 6 | 7 | U.S. Pat. No. 3,578,500 |
|---|---|---|---|---|---|---|---|---|
| Electromotive force, volts | 3.8— −4.7 | 3.8— −4.6 | 3.7— −4.5 | 3.6— −4.4 | 3.5— −4.3 | 3.7— −4.1 | 3.2— −4.1 | 2.0— −4.0 |
| Number* of discharge-charge cycles | 100 | 1200 | 600 | 300 | 100 | 60 | 600 | 1–8 |
| Coefficient of utilization of active masses in discharging with current of 10 mA/cm², % | 100 | 100 | 100 | 100 | 100 | 100 | 100 | 90 |

*The number of discharge-charge cycles given herein demonstrates the end of the experiment, though it may be much more greater.

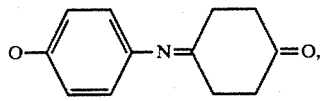

anode active material—a stable anion-radical of naphthalene, electrolyte—tetrahydrofuran containing $LiClO_4$ dissolved therein (concentration of 0.5 mole/l).

Said chemical power supply was made as follows.

At first, a stable electrically neutral radical of indophenoxyl was prepared. For this purpose, a corresponding phenol was oxidized in accordance with the procedure specified in Example 14, the ratio between the starting reagents being the same. Dark brown crystals of electrically neutral radical of 2,2',6,6'-tetra-tretbutyl indophenoxyl were obtained. The yield was 88%.

Next, a sodium salt of an anion-radical of naphthalene was prepared according to the procedure specified in Example 1.

An electrolyte was prepared by dissolving dry LiClO₄ in tetrahydrofuran whose purification and drying were accomplished in accordance with the procedure specified in Example 1.

2,2',6,6' indophenoxyl radical and a sodium salt of an anion-radical of naphthalene were dissolved in the given electrolyte. The resulting solutions were utilized as active solutions in the chemical power supplies.

In the chemical power supplies containing the solutions specified in Examples 1 through 15, such parameters as electromotive force and the number of discharge-charge cycles were determined. Testing results for the chemical power supplies disclosed in Examples 1 through 7 are given in Table 1. In the same Table, there are given for comparison similar parameters of a chemical power supply disclosed in U.S. Pat. No. 3,578,500. The value of electromotive force and that of the number of discharge-charge cycles of chemical power supplies containing solutions specified in Examples 8 through 15 are not given since they are within the limits indicated in the Table and relating to Examples 1 through 7.

While the invention has been described herein in terms of the specific Examples, numerous variations and modifications may be made in the invention without departing from the spirit and scope thereof as set forth in the appended claims.

What is claimed is:

1. A chemical power supply comprising a cathode and an anode including active materials dissolved in an electrolyte based on an organic solvent, and a diaphragm for separating said cathode from said anode, the active material of said cathode being a stable radical selected from the group consisting of a stable cation-radical of an aromatic amine, a stable cation-radical of a heterocyclic amine, a stable electrically neutral radical of an aromatic oxygen-containing compound, a stable electrically neutral radical of an aromatic nitrogen-containing compound, while the anode active material is a stable anion-radical of an aromatic compound.

2. A chemical power supply as set forth in claim 1, wherein a stable cation-radical of substances selected from the group consisting of tri-p-tolyl amine, N,N,N',N'-tetramethyl benzidine, tri-p-bromotriphenyl amine, is employed as a stable cation-radical of an aromatic amine.

3. A chemical power supply as set forth in claim 1, wherein a stable cation-radical of substances selected from the group consisting of N,N'-dimethyl phenazine, N,N'-diphenyl phenazine, N-methyl phenothiazine, thianthrene, is employed as a stable cation-radical of a heterocyclic compound.

4. A chemical power supply as set forth in claim 1, wherein a stable electrically neutral radical of substances selected from the group consisting of 2,6-di-tert-butyl-4-(2',6'-di-tertbutylquinobenzyl)-phenoxyl, 2,2',6,6'-tetra-tretbutylindophenoxyl, is employed as a stable electrically neutral radical of an aromatic oxygen-containing compound.

5. A chemical power supply as set forth in claim 1, wherein a stable electrically neutral radical of a substance selected from the group consisting of diphenylpicrylhydrazyl, triphenylverdozyl, is employed as a stable electrically neutral radical of an aromatic nitrogen containing compound.

6. A chemical power supply as set forth in claim 1, wherein a stable anion-radical of substances selected from the group consisting of naphthalene, an anthracene, benzophenone is used as a stable anion-radical of an aromatic compound.

* * * * *